United States Patent [19]

Sakata et al.

[11] Patent Number: 4,772,636
[45] Date of Patent: Sep. 20, 1988

[54] REEXPANDABLE SHRUNKEN FOAM BODIES OF STYRENE-ACRYLONITRILE TYPE RESIN, METHOD FOR MANUFACTURE THEREOF, AND METHOD FOR FILLING THEREWITH

[75] Inventors: Norihiko Sakata; Itsuo Hamada, both of Suzuka, Japan

[73] Assignee: Asahi Kasei Kogyo Kabushiki Kaisha, Osaka, Japan

[21] Appl. No.: 129,008

[22] Filed: Dec. 4, 1987

Related U.S. Application Data

[63] Continuation of Ser. No. 749,621, Jun. 27, 1985, abandoned.

[30] Foreign Application Priority Data

Jul. 2, 1984 [JP] Japan ............................. 59-135083
Oct. 16, 1984 [JP] Japan ............................. 59-215164

[51] Int. Cl.$^4$ ............................................. C08J 9/22
[52] U.S. Cl. ................................... 521/58; 264/45.4; 264/53; 521/79; 521/147; 521/918
[58] Field of Search ................. 521/58, 79, 147, 918; 264/45.4, 53

[56] References Cited

U.S. PATENT DOCUMENTS

| | | | |
|---|---|---|---|
| 3,347,961 | 10/1967 | Russell | 264/53 |
| 3,384,531 | 5/1968 | Parrish | 521/79 |
| 3,480,507 | 11/1969 | Gouw et al. | 521/79 |
| 3,491,173 | 1/1970 | Kobsa | 521/79 |
| 3,505,249 | 4/1970 | Skochopole et al. | 521/95 |
| 3,967,991 | 7/1976 | Shimano et al. | 264/321 |
| 4,146,451 | 3/1979 | Shirmer | 521/79 |

Primary Examiner—Morton Foelak
Attorney, Agent, or Firm—Birch, Stewart, Kolasch & Birch

[57] ABSTRACT

Improved reexpandable shrunken foam bodies of styrene-acrylonitrile type resin possessing an ability to reexpand to the original volume of the highly foamed state when left standing at room temperature under atmospheric pressure and a method for the manufacture of such reexpandable shrunken foam bodies.

The aforementioned shrunken foam bodies are obtained by causing a styrene-acrylonitrile type resin to contain a prescribed large amount of a specific foaming agent exhibiting a slow gas permeation speed to the base resin and possessing the boiling point exceeding a fixed lower limit, heating the resin with steam thereby setting it to foam highly, and releasing the foamed resin into the atmosphere to be cooled and shrunk therein.

The aforementioned shrunken foam bodies are convenient for the purpose of transportation and storage. They are useful as fillers intended to absorb shocks and insulate heat. The foam bodies, when reexpanded, form useful materials used for in-mold shaped articles designed for absorbing shock and insulating heat.

1 Claim, 4 Drawing Sheets

REEXPANDABLE SHRUNKEN FOAM BODIES OF STYRENE-ACRYLONITRILE TYPE RESIN, METHOD FOR MANUFACTURE THEREOF, AND METHOD FOR FILLING THEREWITH

This application is a continuation of application Ser. No. 749,621 filed on June 27, 1985, now abandoned.

BACKGROUND OF THE INVENTION

1. Field of the Invention

This invention provides improved reexpandable shrunken foam bodies of styrene-acrylonitrile type resin and a method for the manufacture thereof. Specifically, the improvement resides in the fact that the foam bodies now in a state shrunken from the former highly foamed state possess an ability to allow themselves, on standing at room temperature under atmospheric pressure, to reexpand substantially to the original volume of the highly foamed bodies. These foam bodies, therefore, may be transported in their shrunken state to a site of actual use, fed in a cavity desired to be filled with foamed bodies, and allowed to reexpand in the cavity. Or, the foam bodies may be allowed to reexpand at the site of actual use and, in the expanded state, fed into the cavity. Also, the foam bodies in the reexpanded state may be mutually bonded by fusion inside a mold to yield a highly foamed shaped article of high quality suitable for cushioning or insulation of heat.

2. Description of the Prior Art

It has been widely known that bodies of foam are obtained by causing a styrene resin to contain therein a volatile foaming agent and thermally foaming the resin. It has also been known that these bodies of foam are useful as cushioning material for filling the gap between a container and an object contained therein or as a material for a cushioning container or a heat insulation board produced by the procedure of permitting air to permeate into such bodies of foam and causing the air-filled bodies to be mutually bonded by thermal foaming in a mold of a prescribed pattern.

The techniques which are often found as desirable in this field of art include (1) the technique of producing a highly foamed body of good quality, (2) the technique of producing such a highly foamed body in a single step of foaming, and (3) the technique of enabling the foamed bodies to be transported economically to a fabricating plant (site of actual use). The reason is respectively (1) that within the range in which the foamed body is allowed to retain necessary properties intact, the amount of the resin to be used per unit volume of the foamed body decreases in proportion as the foaming of resin proceeds to a higher extent, (2) that the cost of production decreases in proportion as the number of steps involved in the operation of foaming decreases, and (3) that transportion of highly foamed bodies to a distant destination turns out to be an act as uneconomical as the act of transporting an empty container.

It is, nevertheless, widely held that these techniques earnestly sought after in the field are very difficult to realize. The reasons are as follows: (1) As the expansion ratio of the resin being foamed is increased, the individual cells in the foamed body become more liable to open into one another or to grow into nonuniformly dispersed sizes and, consequently, the produced foamed body acquires desired properties with great difficulty. (2) When the foaming of such high extent is to be effected in a single step, the maximum amount of the foaming agent allowed to be contained in the resin and the efficiency of the foaming agent directly contributing to the expansion of the resin have their limits and these limits impose serious restrictions on the operation of foaming. (3) The foamed body, once shrunken, does not readily expand to its original volume. If the shrunken body is forced to reexpand by any immoderate treatment, the reexpanded body acquires unsatisfactory properties.

An ideal foaming technique which can be hoped for reasonably from the standpoint of the technical standard prevalent today, therefore, is one which is capable of producing a highly foamed body in a single step of foaming, causing the foamed body to be shrunk to a volume small enough for convenient storage and transportion, and enabling the shrunken foamed body to be reexpanded into a highly foamed body of good quality at the time of its actual use.

A thorough review of the techniques heretofore known to the art from the aforementioned point of view reveals that a few patent publications cover inventions contemplating achievement of such techniques. The technique disclosed in the specification (specifically in working examples) of U.S. Pat. No. 3,425,965 produces partially collapsed (shrunken) foam particles by causing chlorostyrene polymer to contain therein 6.1% of a volatile organic foaming agent (isopentane), heating the polymer by contact thereof with steam of high pressure, and withdrawing the heated polymer under atmospheric pressure. These particles, when left standing under atmospheric pressure, are reexpanded into foam particles of a volume about 4.4 times (the largest value given in Table 1) the volume occupied by the shrunken particles. The technique disclosed in the above patent, as summarized above, may answer the aforementioned description of an ideal technique. Its technique, however, entails a serious problem that it is applicable only to chlorosytrene polymer, a resin scarcely available commercially. An attempt to adopt a sytrene-acrylonitrile copolymer in the place of the chlorostyrene polymer with a view to meeting the requirement for high resistance to heat and to oil imposed on the finally produced foamed article and, by the application of the technique in question to the styrene-acrylonitrile copolymer, to produce shrunken particles reexpandable at a high expansion ratio encounters the hindrance that the foamed particles obtained, at all, have their individual cells ruptured and can hardly be expected to possess the desired reexpandability.

In the specification of U.S. Pat. No. 3,505,249 there is disclosed a technique which produces reexpandable shrunken bodies of resin foam by foaming expandable thermoplastic resin particles under a vacuum, subsequently releasing the foamed resin particles under atmospheric pressure, and then collapsing them with pressure. In Example 3 cited therein, there is given a statement to the effect that styrene-acrylonitrile copolymer particles containing 7.6% by weight of n-butane were foamed under a vacuum to a 216-fold expansion, released under atmospheric pressure and consequently collapsed to a 19-fold expansion, then immediately left standing in liquid nitrogen for five minutes, and subsequently warmed to room temperature and consequently reexpanded to a 190-fold expansion. (the reexpansion wa obtained to 29-fold when the immersion in liquid nitrogen was omitted.) The problems encountered by this technique reside in the foaming under a vacuum and the reexpansion by the treatment with liquid nitrogen.

To be specific, the limitations imposed on the reexpandability automatically by the amount of the foaming agent contained in the resin and the efficiency of the foaming agent allowed to contribute to the actual foaming are overcome by carrying out the foaming under a vacuum. The reexpandability which the shrunken particles have lost substantially is conferred upon the shrunken particles by having the particles immersed in liquid nitrogen. These steps of operation are so particular that their material-repeatable on a laboratory scale entail many unsolved problems as to equipment, expense, and operation on a commercial scale.

In the specification of U.S. Pat. No. 3,347,961, specifically at column 5, lines 1–25, there is a statement to the effect that foamed particles of a high expansion ratio are obtained of styrene-acrylonitrile copolymer [152-fold expansion in bulk ratio (reciprocal of bulk density)]. The method disclosed in the above patent produces uncollapsed highly foamed particles by causing particles freshly foamed to a high extent to be moved, before being collapsed by cooling, directly into a flow of hot air in circulation and allowing them to age therein for a long time. This method has not yet matured to the extent of commercialization because it takes a long time and requires use of a large apparatus. In view of the fact that highly foamed particles of styrene-acrylonitrile copolymer, once shrunk, are not readily reexpanded at room temperature and prove useless for the purpose pursued, the above patent provides one approach devoted to preventing the foamed particles from shrinkage. It does not have the technical idea of producing shrunken foamed particles capable of reexpansion.

Shrunken foam bodies of a styrene-acrylonitrile copolymer possessing an ability to allow themselves, on standing at room temperature under atmospheric pressure, to reexpand to the original volume before shrinkage at the former expansion ratio (not less than 80-fold) have never existed.

It has been held that the aforementioned reexpandable shrunken bodies of styrene-acrylonitrile copolymer foam are difficult to be fabricated from the standpoint of process of manufacture. No method has been perfected which permits their satisfactory production. Other uneconomical methods highly special in their operation have been proposed as mere makeshift.

In the field of foamed articles which, by virtue of their reexpandability, are useful for the production of heat insulation boards, cushioning materials, and buoys, the outstanding properties of styrene-acrylonitrile resin, a close analog to general purpose resins, have not been utilized commercially.

SUMMARY OF THE INVENTION

An object of this invention, therefore, is to provide shrunken foam bodies of styrene-acrylonitrile copolymer resin possessing the ability, on standing at room temperature under atmospheric pressure, to reexpand to the original volume before shrinkage at the former expansion ratio (not less than 80-fold) and a method for the manufacture of the reexpandable shrunken bodies. Specifically, this invention aims to confer outstanding properties upon the shrunken bodies of highly foamed resin and render the operation of a series of steps economical and, thereby, facilitate commercialization of the reexpandable shrunken foam bodies of styrene-acrylonitrile resin. Another object of this invention is to provide a method for the most characteristic utility of the aforementioned shrunken bodies of resin foam.

The term "expansion ratio" as used in the present invention means the reciprocal of the density of a given resin foam, to be reported by the denomination of ml/g.

DETAILED DESCRIPTION OF THE INVENTION

Figure 1:
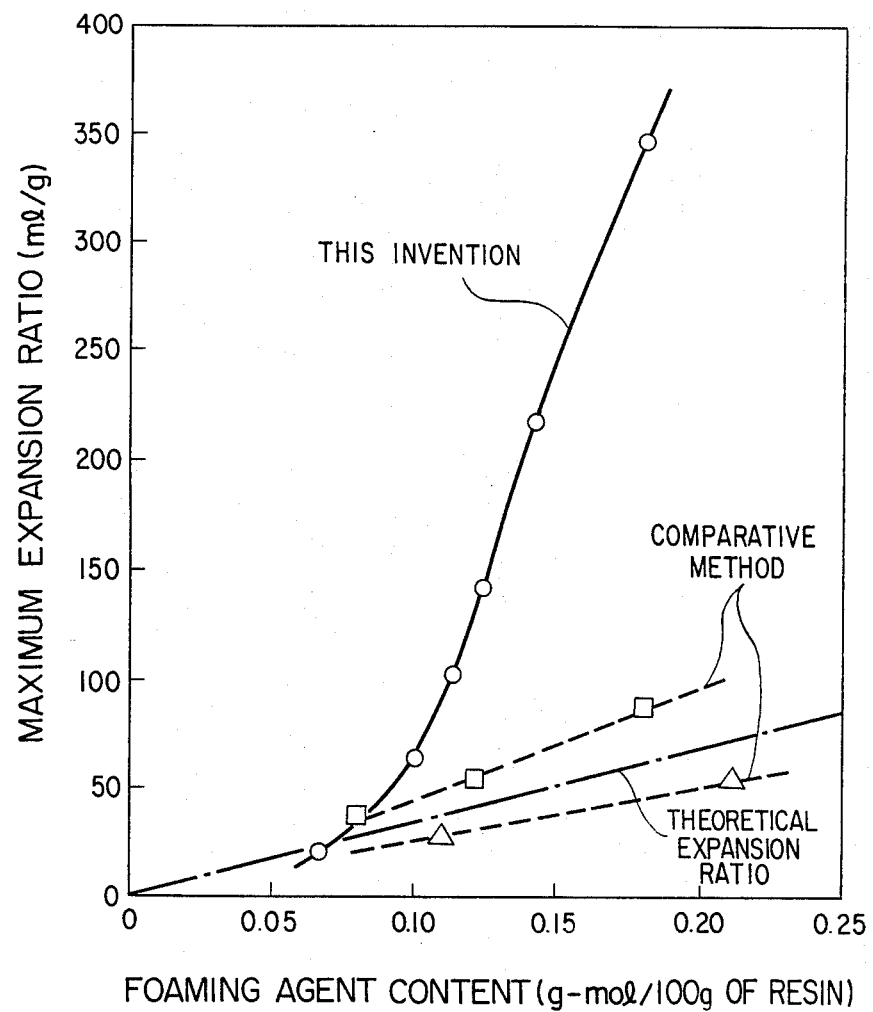
FIG. 1 is a graph showing the relation between the foaming agent content and the maximum expansion ratio obtained by the method of the present invention and the comparative method.

The aforementioned unsolved problems of the conventional art are solved by the present invention. The measures adopted by this invention for their solution will be summarized below in such a manner as to clarify the relation between the method used for manufacture and the shrunken bodies of resin foam manufactured thereby.

I. Method for manufacture

The method used herein for the manufacture of reexpandable shrunken foam bodies of styrene-acrylonitrile type resin, in summary, comprises:

I-a. Using, as a foaming agent, a volatile foaming agent (B) consisting of one volatile organic foaming agent or a mixture of two or more volatile organic foaming agents to which the base resin exhibits a permeability coefficient of not more than 1/5 of the permeability coefficient the resin exhibits to air and possessing the boiling point of not more than 30° C. under atmospheric pressure, either alone or in combination with other volatile organic foaming agents, I-b. Causing the base resin to contain therein the aforementioned foaming agent in an amount of not less than 0.11 g mol/(100 g of resin) as content of the aforementioned foaming agent (B) component based on the base resin, I-c. Directly heating the resin with steam (through physical contact) thereby allowing the resin to be foamed in a single step at an expansion ratio of not less than 80-fold, and I-d. Releasing the bodies of resin foam under atmospheric pressure to be cooled therein and shrunk to a volume of not more than $\frac{2}{3}$ of the maximum volume obtained during the course of foaming.

II. Shrunken bodies of resin foam

The shrunken bodies of resin foam manufactured by the method described above are characterized, in summary, by:

II-a. Containing the aforementioned volatile organic foaming agent (B),

II-b. In an amount of not less than 0.01 g mol/(100 g of resin),

II-c. The bodies of resin foam prior to shrinkage being foamed in an expansion ratio of not less than 80-fold and having a closed cell content of not less than 75%, and II-d. The shrunken bodies possessing an ability to cause themselves, on standing at room temperature under atmospheric pressure, to reexpand at a ratio of not less than 1.5 times.

III. Characteristic utility

The aforementioned shrunken bodies of resin foam can be stored or transported in their shrunken state. On arrival at a given site of actual use, a given gap desired to be filled with the foamed body can be filled with an aggregate of highly foamed bodies of styrene-acrylonitrile resin by:

1. Preparing the reexpandable shrunken bodies of resin foam in their shrunken state.
2. Feeding the shrunken bodies of resin foam into the cavity desired to be filled, and
3. Allowing the shrunken bodies of resin foam as placed in the cavity to stand at room temperature under atmospheric pressure and reexpand.

Now, the functions produced and fully utilized by the present invention will be described below in contrast to the measures for the aforementioned solution of unsolved problems itemized above. First, the definition of the base resin constitutes the major premise for the selection of the particular field of this invention. It designates the category of object that the characteristic features and properties possessed by the styrene-acrylonitrile type resin will be fully utilized in the field of reexpandable shrunken bodies of resin foam.

The limitation of the type of the foaming agent indicated in I-a and the incorporation of this foaming agent in a large amount into the resin indicated in I-b, coupled with the thermal foaming with steam indicated in I-c, enable the resin under treatment to be foamed in a single step of foaming at a high expansion ratio of not less than 80-fold. The foaming of the resin obtained at the high expansion ratio in this case makes use of (1) the high foaming action derived from the use of the foaming agent of a low gas permeation speed in a large amount, and (2) the conspicuous foaming accelerating action manifested by the steam permeating the layer of foam cell of styrene-acrylonitrile type resin at a high speed.

The bodies of resin foam consequently obtained are greatly shrunk by the cooling action indicated in I-d (mainly owing to the condensation of the steam entrapped within the bodies) to give rise to shrunken bodies of resin foam defined in II-a, II-b, II-c, and II-d.

Owing to the factor associated with the requirement of I-a, the shrunken bodies of resin foam consequently obtained continue to retain therein, even after the high foaming, the aforementioned foaming agent (II-a) in a gaseous state in an amount of not less than 0.01 g mol/(100 g of resin) (II-b). This retention of the foaming agent, coupled with the high closed cell content existing at this time (II-c), enables the shrunken bodies of resin foam to generate an action of drawings in the ambient air and manifest the ability to reexpand at room temperature under atmospheric pressure indicated in II-d. In this case, the high foaming indicated in II-c imparts flexibility to the bodies of resin foam and smoothly facilitates the reexpansion indicated in II-d.

While the fulfilment of the requirements indicated in II-a, II-b, II-c, and II-d brings about various forms of economic utility, III shows the most characteristic utility found for the reexpandable shrunken bodies of resin foam of this invention.

Now, the actual forms in which the functions produced by this invention as described above are manifested will be described more specifically below.

In FIG. 1 (showing the data involved in Example 1 and Comparative Experiments 1 and 2), the horizontal axis represents the scale of the amount of foaming agent (in g mol/100 g of resin) contained in the resin and the vertical axis the scale of the expansion ratio of the bodies of resin foam (in ml/g). Concerning the relation between the amount of the foaming agent contained and the maximum expansion ratio attained by the bodies or resin foam produced, the solid line represents the data based on the method of this invention, the dotted line represents the data based on the method of comparative experiment, and the chain line represents the data based on the calculation of the theoretical equation, $PV=nRT$ (wherein P denotes the pressure of the atmosphere, i.e. 1 atm, V denotes the volume occupied by the foaming agent in the gaseous state, n denotes the amount of the foaming agent contained as reported by the denomination of gram mol per 100 g of resin, R denotes the gas constant, i.e. 82.05 cc atom/mol°K, T denotes the temperature at the time of foaming T°K, and K denotes the absolute temperature). The graph is a vivid depiction of the actual state of the aforementioned high foaming promoting action utilized fully in the present invention.

Generally, the extent to which a given synethetic resin is foamed is increased in direct proportion to the amount of the foaming agent allowed to be contained in the resin. The extent to which the foaming is actually obtained is lower than the theoretical value because part of the contained foaming agent escapes from the foaming body and fails to contribute to the foaming. In the case of the foaming of a foamable styrene type resin by the use of steam, it has been known that the foaming proceeds to an extent higher than the theoretical value because the steam penetrates the resin and promotes the expansion of the resin. The dotted line shown in FIG. 1 indicates that this phenomenon occurs in the foaming effected by the method of comparative experiment. The noteworthy functions fully manifested and utilized in the present invention are the fact that the phenomenon of high foaming promotion due to the steam shown by the scale of distance from the aforementioned curve of theoretical value is very conspicuous and the fact that the high foaming of resin at a very high expansion ratio exceeding 80-fold, or even ranging from 100-fold to 300-fold, a level hardly attainable by the conventional foaming technique using the conventional foaming agent can be easily attained by the present invention.

A logical explanation of this phenomenon may be offered by a postulate that (1) the inclusion of the specific foaming agent (2) in a large amount synergistically cooperates with (3) the function of foaming promotion due to the permeation of steam into the resin at a high speed. To be specific, this phenomenon is observed (1) only when the speed of permeation of the foaming agent into the styrene-acrylonitrile type resin is amply low and falls below 1/5 of the speed of penetration of air. The effect of this function is manifested (2) only when the aforementioned foaming agent is contained in an amount of not less than 0.11 g mol/(100 g of resin) as shown in FIG. 1. Further, this effect is observed (3) when steam is used as the medium for heating and it is not observed when any other medium than steam, such as, for example, hot air is used. These facts have been discovered by the present inventors.

The bodies of resin foam expanded at a high ratio by the direct heating with steam as described above are violently shrunk when they are released from the atmosphere of hot steam into the atmosphere and allowed to be cooled even to a slight extent. This phenomenon may be logically explained by a postulate that the resin foam which has been expanded at a high ratio and transformed into thin flexible membranes is shrunk in a crushed state after it has ceased to bear the pressure difference generated therein owing to the condensation of the steam entrapped within the cells of the resin foam. The degree of this shrinkage increases with the extent of foaming. By this shrinkage, the bodies of resin foam are shrunk to a volume of not more than ⅔ of the original volume of the bodies of resin foam before shrinkage. Consequently, there are obtained shrunken bodies of resin foam apparently full of wrinkles. In the present invention, the shrinkage reduces the volume of resin foam to less than about ⅔ of the original volume where the expansion ratio is about 80-fold before the shrinkage, to about 1/5 of the original volume where the expansion ratio is about 150-fold, and to about ⅛ of the original volume where the expansion ratio is about 250-fold.

Figure 2:
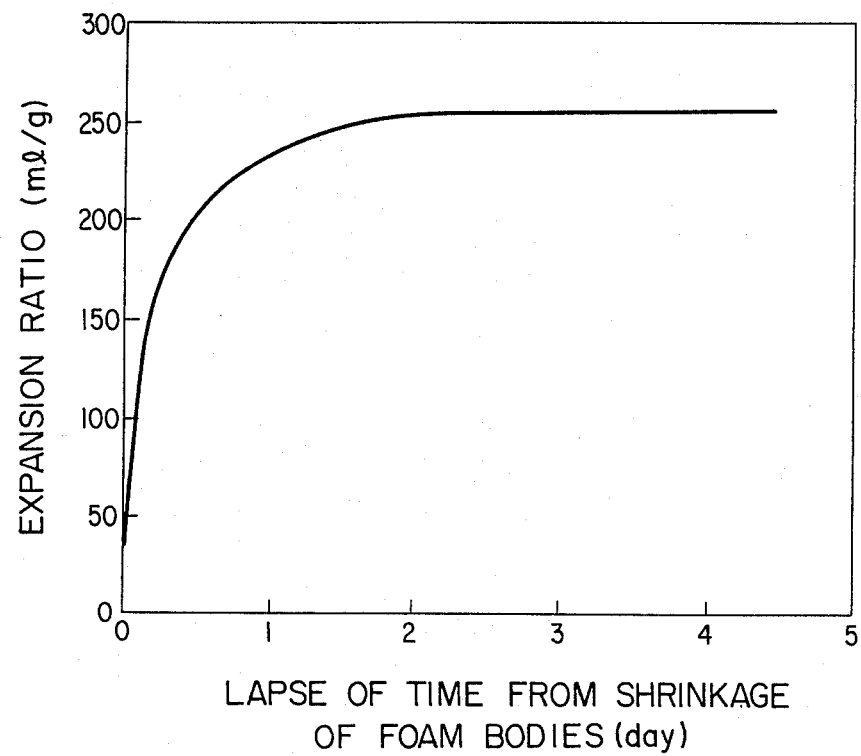
FIG. 2 is a graph showing the reexpansion behavior exhibited by shrunken pellets of resin foam according to the present invention.

If the shrunken bodies of resin foam continue to remain in the shrunken state, they do not suit the practical utility contemplated by this invention. FIG. 2 shows the locus of the reexpansion which occured when the shrunken boides of resin foam obtained by first foaming the resin to about 250 times and then shrinking the expanded bodies to about ⅛ of the volume existing after the expansion were left standing at 10° C. under atmospheric pressure. From this graph, it is clearly noted that the shrunken bodies were reexpanded to a 250-fold expansion over a period of about 48 hours. This phenomenon of incredulous reexpansion is not caused by human will. It is induced because the partial pressure difference of air generated between the ambient air and the interior of the resin foam forces the ambient air to penetrate the bodies of resin foam and inflate the individual cells within the resin foam which remains in a crushed state and yet retains the individual cells all in a closed structure, with the result that the individual cells in the resin foam are allowed to resume their original state. In other words, inside the cells of the resin foam which has been expanded at a high ratio and then shrunk, the foaming agent is required to remain amply in a gasified state enough to generate a partial pressure difference between the interiors of the cells and the ambient air. In this case, since (1) the foaming agent showing a low gas permeation speed to the base resin is adopted and (2) this foaming agent is used in a large amount and the foaming is caused under conditions specifically selected to preclude otherwise possible escape of the foaming agent, the amount of the foaming agent allowed to remain inside the cells of resin foam is large and, what is more, (3) the foaming agent which is of the type boiling at a temperature of not more than 30° C. under atmospheric pressure is gasified within the cells sufficiently for generating within the cells a partial pressure difference necessary for the purpose of inducing the penetration of the ambient air into the cells. The term "ambient air" normally denotes the atmosphere but, if necessary, it may be a gas to which styrene-acrylonitrile type resins exhibit a permeability coefficient which is about the same as or higher than that the styrene-acrylonitrile type resins exhibit to air. The ambient air is generally under about the atmospheric pressure but it may be lowered to the minimum of more than ½ atmosphere depending upon the degree of shrinkage/reexpansion and increased to the maximum of infinity, if necessary.

Further in the present invention, the fact that the resin itself is foamed at a high ratio making the walls of the cells sufficiently thin facilitates the penetration of the ambient air into the cells and the inflation even under a relatively small pressure difference, thus making the aforementioned reexpansion easy and smooth.

It has been ascertained to the inventors that while the amount of the foaming agent remaining within the shrunken bodies of resin foam increases in proportion to the expansion ration, it is required to exceed at least 0.01 g mol/(100 g of resin) to warrant sufficient reexpansion of the shrunken bodies of resin foam. So long as the amount of the foaming agent exceeds this lower limit, the foaming agent produces a partial pressure of at least 0.02 atmosphere within the foam resin after the shrunken bodies have been reexpanded to their original volume.

As regards the specific foaming agent referred to in this invention, concrete examples of the volatile organic foaming agent (A) to which the base resin exhibits a permeation coefficient of not more than 1/5 of the permeation coefficient the resin exhibits to air include n-butane (gas permeation coefficient not more than 1, boiling point $-0.5°$ C.), i-butane (not more than 1, $-12°$ C.), n-pentane (not more than 1, 36° C.), i-pentane (not more than 1, 28° C.), neo-pentane (not more than 1, 10° C.), trichloromonofluoromethane (1.0, 24° C.), dichlorodifluoromethane (not more than 1, $-30°$ C.), dichlorotetrafluoroethane (not more than 1, 4° C.), and monochlorodifluoromethane (not more than 1, $-41°$ C.). [The first numerical value shown within the parentheses represents the gas permeation coefficient (in cc mil/100 in$^2$ day atm) of the indicated foaming agent determined at 25° C. by the method of ASTM D-1434 with respect to styrene-acrylonitrile resin have an acrylonitrile concentration of 25% by weight. The air permeation coefficient with respect to the same resin is 20. The last numerical value given in the parentheses represents the boiling point of the foaming agent under atmospheric pressure (1 atm.).] This limitation of the permeation speed is important for the purpose of enhancing the foaming effect of the foaming agent itself during the course of expansion and, at the same time, allowing the foaming agent to remain within the resin foam in as large an amount and for as long a time as permissible.

Generally, either one volatile organic foaming agent or a mixture of two or more volatile organic foaming agents answering the foregoing description is adopted so as to suit the particular base resin to be used and the manner of the inclusion of the foaming agent in the resin. For the purpose of the method of manufacture contemplated by this invention, either one member or a mixture of two or more members selected from the aforementioned group of foaming agents (A) is adopted. In this selection, due attention should be paid to the fact that the foaming agent used at all possesses the boiling point of not more than 30° C. under atmospheric pressure. This requirement with respect to the boiling point and the aforementioned requirement with respect to the permeation speed of the foaming agent exhibited to the base resin are indispensable to the fulfilment of the condition that the foaming agent remaining within the resin foam should be in a gasified state and should be capable of giving rise to a partial pressure difference between the interior of the resin foam and the ambient air even at room temperature ($-10°$ C. to 30° C.). Specifically, it is desirable to use a foaming agent (B) which possesses the boiling point of not more than the temperature which is 20° C. above the ambient air. In the district of mild climate, for example, the foaming agent (B) may possess the boiling point of not more than 30° C. In the district where the temperature of the ambient air lingers in the neighborhood of 0° C., it is advantageous to use a foaming agent possessing a low boiling point of say 20° C.

The present invention, with a view to enabling the base resin to be foamed to a high extent and allowing the foaming agent to remain in a large amount within the resin foam, requires the foaming agent to be contained in the resin in an amount of not less than 0.11 g mol/(100 g of resin). The foaming agent to be selected on the aforementioned standard often exhibits compatibility of its own to the resin under treatment and, therefore, is not always allowed to be freely contained in any desired amount in the resin. At times, it proves desirable to enhance the compatibility of the selected foaming agent with the resin by combining the foaming agent with some other foaming agent which possesses high compatibility with the resin despite its high gas permeation speed exhibited to the styrene-acrylonitrile resin. Concrete examples of the foaming agent answering this description are methyl chloride (gas permeation coefficient not less than 5 times that for air, boiling point $-24°$ C.), ethyl chloride (not less than 5 times, 12° C.), methylene chloride (not less than 10 times, 40° C.), and dimethyl ether (about 5 times, $-25°$ C.). In this case, the foaming agent (B) which consists of one member or a mixture of two or more members of the group of foaming agents (A) mentioned above and possesses the boiling point of not more than 30° C. under atmospheric pressure deserves particular attention and this foaming agent (B) is required to be contained in the base resin in an amount of not less than 0.11 g mol/(100 g of resin).

Where the foaming agent is required to be contained in a large amount in the resin and to be contained therein stably, this foaming agent (B) is desired to be formed preponderantly of trichloromonofluoromethane. Where the time spent in the reexpansion of the shrunken bodies of resin foam is required to be shortened and the dependency of the speed of reexpansion upon the temperature to be decreased, it proves advantageous to use the foaming agent (B) which incorporates a foaming agent (A) of a sufficiently low boiling point. Concrete examples of the foaming agent (A) answering this description include dichlorodifluoromethane (boiling point $-30°$ C.), monochlorodifluoromethane ($-41°$ C.), and dichlorotetrafluoroethane (4° C.).

The shrunken bodies of resin foam of the present invention reexpand at a ratio corresponding to the aforementioned ratio of shrinkage. Thus, they expand to not less than 1.5 times the volume existing immediately after shrinkage where the expansion ratio before the shrinkage is about 80-fold, to about 5 times where the expansion ratio is about 150-fold, and to about 8 times where the expansion ratio is about 250-fold. The desire to heighten the speed of reexpansion is filled by effecting this reexpansion in a gas at elevated temperatures. The upper limit of this temperature is suitable to be not more than 90° C. in due consideration of the resistance of the foam body to heat.

In the present invention, the shrunken bodies of resin foam immediately begin to reexpand when they are placed in the atmosphere. They are allowed to retain their shrunken state intact when they are stored in a container capable of mechanically restraining the reexpansion or in a tightly sealed bag made of a material impervious or sparingly pervious to air. The shrunken bodies of resin foam stored therein begins to reexpand as soon as it is removed therefrom. The retention of this reexpandability of the shrunken bodies of resin foam in the shrunken state lasts semi-permanently when the container is capable of holding the shrunken bodies in an airtight condition.

In the bodies of resin foam obtained in accordance with this invention, the content of closed cells is not less than 75%. The closed cell content rises even above 95% where the expansion ratio is relatively low falling in the neighborhood of 150-fold. The closed cell content falls to the level of 80% when the expansion ratio is heightened to about 300-fold, for example. In the present invention, for the purpose of conferring high reexpandability upon the shrunken bodies of resin foam and further for the purpose of enabling the shrunken bodies to retain their shrunken state stably for a long time and yet retain their shrunken state stably for a long time and yet retain their high reexpandability intact, the closed cell content is desired to exceed 75%.

The term "styrene-acrylonitrile type resin" as used in the present invention means what is produced by copolymerizing styrene and acrylonitrile by any of the methods known to the art. As resins analogous in attributes to the styrene-acrylonitrile type resin defined above, those copolymers obtained by using para-methyl styrene, α-methyl styrene, vinyl toluene, and tertiary butyl styrene in the place of styrene and using methacrylonitrile in the place of acrylonitrile or using other comonomers expected to confer additive properties in proportions incapable of impairing the properties inherent in the styrene-acrylonitrile type resin are embraced by the definition of the copolymer resin of the present invention.

Use of a light stabilizer, an antistatic agent, a coloring agent, or a flame retardant or a treatment for the formation of a cross-linked structure is a generally accepted practice. This invention does not have a special reason for prohibiting this practice.

As a means of enabling the resin to contain the foaming agent therein, the autoclave method or the extrusion impregnation method known to the art can be adopted. Between the two methods cited above, the extrusion impregnation method proves advantageous over the autoclave method in respect that it warrants smooth inclusion of nucleating agent and uniform dispersion of the foaming agent. The desired inclusion of the foaming agent is accomplished specifically in a procedure which comprises blending the styrene-acrylonitrile resin with nucleating agent, feeding the resin to an extruder, introducing the foaming agent satisfying the requirement of this invention in a specified amount under pressure into the extruder zone having the resin suitably melted, forwarding the molten resin containing the foaming agent to the mixing and cooling zone of the extruder to be thoroughly kneaded and adjusted to a prescribed temperature, discharging the prepared resin mixture through the nozzle of a desired cross section, suddenly cooling the extruded resin mixture in its unfoamed state as with cold water, and cutting the cooled product.

The shape of the aforementioned bodies of foamable resin is suitably selected in due consideration of the purpose for which the resin foam of this invention is used and the expansion ratio to be involved. The bodies may be produced in any desired shape. Examples of the shape include sphere, cube, tube, cord, thread, and section profile. As concerns the size of the bodies, the minimum wall thickness of such bodies is desired to exceed 0.2 mm from the standpoint of ensuring safe retention of the foaming agent in the bodies.

For the formation of cells and for the adjustment of cell size, the cell size controlling agent and the nucleating agent known to the art can be used. For the purpose of producing a resin foam possessing a uniform cell diameter in the range of 1 mm to 0.05 mm and a high closed cell content, it is desirable to use talc, for example, as the nucleating agent in an amount of 0.01 to 1% by weight based on the base resin.

At times, foamable styrene-acrylonitrile resin particles may be annealed in warm water at a temperature incapable of inducing the foaming as in the range of 70° to 30° C. for a period of 3 to 60 minutes. This annealing often proves to be an advantageous measure for the purpose of uniformizing the fine cells and giving the resin foam a high closed cell content.

For the present invention, it is an essential requirement that the bodies of foamable resin should be foamed by direct application of heat using steam as the heat medium. It suffices to use this steam with pressure falling in the range of 0 to 2 kg/cm$^2$ G. The heating time is selected generally in the range of 10 to 700 seconds, to suit the expansion ratio aimed at. From the standpoint of process of manufacture, the foaming effected in the present invention is characterized by enabling the resin to be foamed at a high expansion ratio in a single step of operation in a short period of heating.

In the specification of this invention, the expansion ratio measured at the time the shrunken bodies of resin foam have been thoroughly reexpanded is reported as the expansion ratio prior to the shrinkage because the expansion ratio existing immediately after the foaming and prior to the shrinkage cannot be measured with tolerable exactness. The closed cell content in the shrunken bodies of resin foam is in the same situation as the aforementioned expansion ratio. Since the closed cell content is not varied during the course of the recovery from the shrinkage, the closed cell content after the reexpansion is reported as a representative value.

The shrunken bodies of resin foam of the present invention have resulted from shrinkage at a high ratio. They retain their reexpandability for a very long time when stored airtight in their shrunken state. Thus, they may be stored or transported to the site of actual use in their shrunken state. They can be readily reexpanded when necessary simply by being removed from their tightly sealed containers.

The shrunken bodies of resin foam may be, either directly or as contained in suitable bags of net, placed in a gap between a box and its content or a gap between opposed walls for the purpose of protecting the content of the box against shock or thermally insulating one of the walls from the other wall.

In this case, the shrunken bodies of resin foam can be fed to the aforementioned gap and then allowed to reexpand so as to fill up the gap with an aggregate of reexpanded bodies of resin foam. The supply of the shrunken bodies to the gap and the tight filling of the gap with the aggregate of reexpanded bodies of resin foam are easily attained without requiring extra treatments such as application of heat or generation of chemical reaction, even when the gap is too narrow to permit ready access. Thus, the shrunken bodies of resin foam of this invention enjoys high economic utility.

Figure 3:
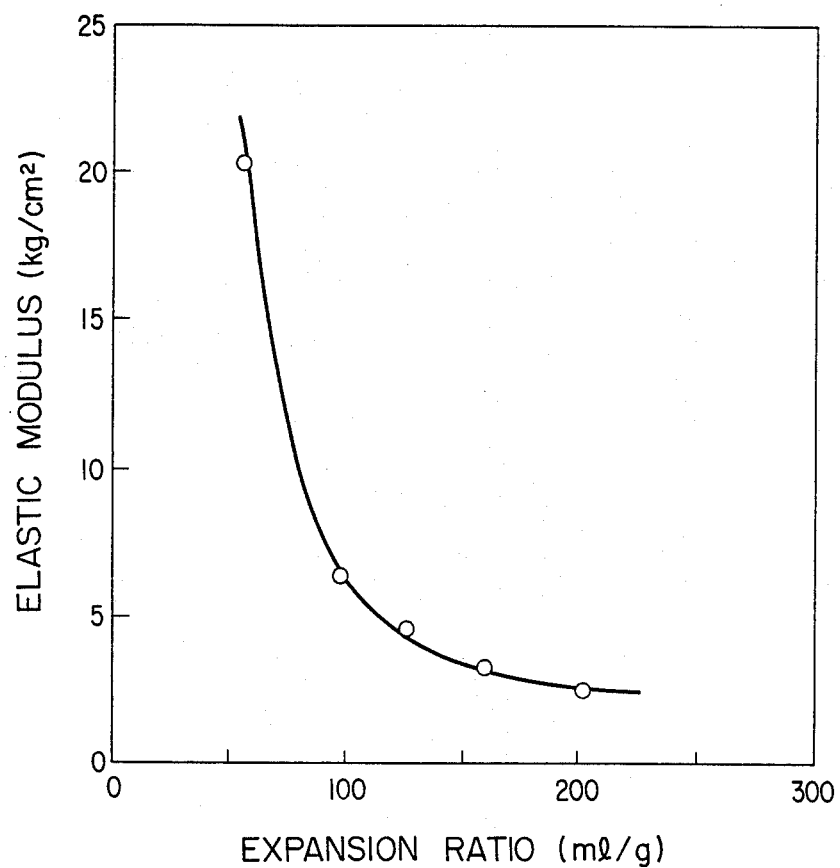
FIG. 3 is a graph showing a typical relation between the expansion ratio and the elastic modules of the molded foam article.
Figure 4:
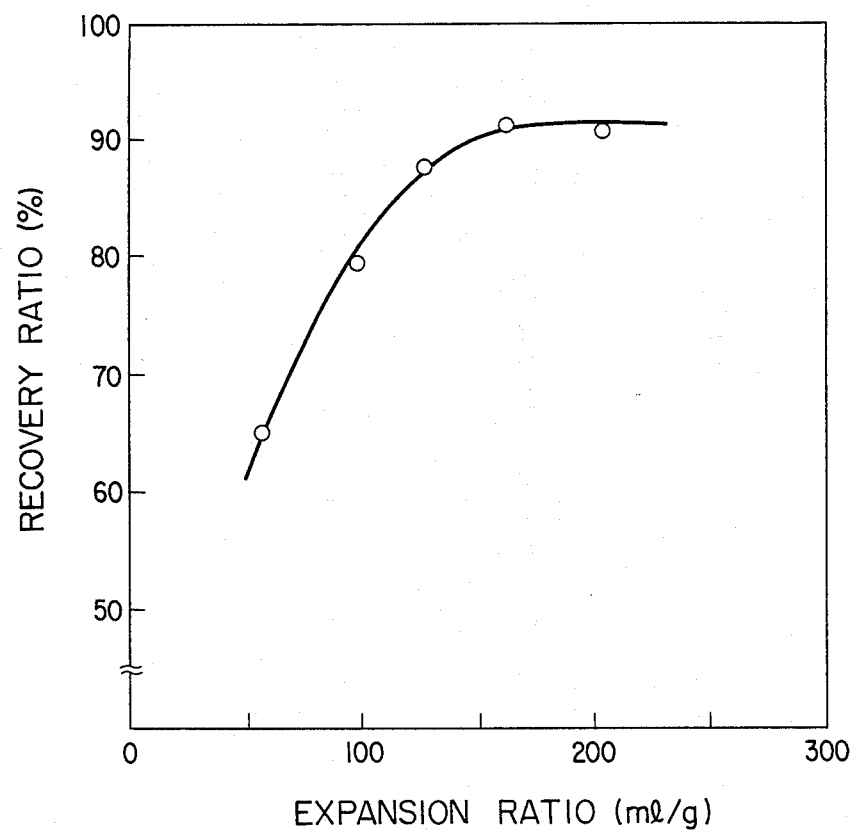
FIG. 4 is a graph showing a typical relation between the expansion ratio and the recovery ratio of the molded foam article.

Alternately, the reexpanded bodies of resin foam of the present invention may be placed to capacity in a mold provided with a multiplicity of small vents, then thermally expanded with steam for intimate mutual fusion, and consequently transformed into an integrally shaped resin foam faithfully conforming to the pattern of the cavity of the mold. Depending on the method of molding to be adopted, the expansion ratio of the shaped resin foam consequently obtained is variable from a level lower to a level higher than the expansion ratio of the foam body used. Particularly the use of the bodies of resin foam fulfilling the requirement of this invention offers the advantage that the produced shaped resin foam enjoys flexibility and resiliency as shown in FIG. 3 and FIG. 4. Therefore, the shaped resin foams are, as they can be produced in a widely variable shape, useful as heat insulation boards, heat insulation containers, cushioning materials, and cushioning containers Thus the economic value of the present invention is literally great.

This invention is constructed as described above and makes a profound contribution to industry by providing shrunken bodies of resin foam capable of reexpanding to the original volume at room temperature under atmospheric pressure and a method for the manufacture of these shrunken bodies of resin foam.

To be more specific, the method of this invention enables the shrunken bodies of styrene-acrylonitrile resin foam which have heretofore been regarded as unattainable unless by a special complicated foaming process to be obtained by an extremely simple and convenient process. Moreover, the shrunken bodies of resin foam produced by this method can be stored or transported in their shrunken state and, at the time of actual use, can be readily and inexpensively reexpanded to their original volume merely by being released from their tightly sealed containers into the atmosphere. Further, the reexpanded bodies of resin foam at high expansion ratio obtained in this invention can be molded into foam articles possessing a foam property surpassing the level of foam property exhibited by the conventional rigid resin foam. Therefore, they find extensive utility in applications such as heat insulation materials, cushioning materials, and buoys for which the characteristic properties of styrene-acrylonitrile resin now can be exploited.

PREFERRED EMBODIMENTS

Now, the method of the present invention will be described more specifically below with reference to working examples and comparative experiments.

EXAMPLE 1

A mixture of 100 parts by weight of styrene-acrylonitrile resin (produced by Asahi Chemical Industry Co., Ltd. and marketed under trademark designation of "Styrac AS769") with 0.2 parts by weight of talc as a cell size controlling agent was fed at a rate of 2 kg/hr to an extruder having a screw diameter of 30 mm to be thermally gelled (with the screw operated at 30 rpm and the leading end of the screw kept at 220° C.). At the foaming agent injection port formed at the leading end part of the screw, trichloromonofluoromethane (gas permeation coefficient not more than 1/5 of the permeation coefficient for air, boiling point 24° C.) was introduced as a foaming agent under pressure in an amount of 0.23 g mol/100 g of resin). At the subsequent temperature adjusting step, the resultant mixture was thoroughly mixed and cooled to 110° C. Through a die provided with a multiplicity of orifices 0.8 mm in diameter, the mixture was extruded into strands. The strands were immediately cooled with cold water and chopped with a cutter to obtain unfoamed resin pellets 1 mm in diameter and 3 mm in length.

The foamable resin pellets mentioned above were left standing and curing at room temperature. Along the course of time, they were sampled and thermally foamed with steam of 0.3 kg/cm² in gauge pressure to determine the change in the relation between the foaming agent content and the foaming behavior.

In the case of a sample having a foaming agent content of 0.18 g mol/(100 g of resin), for example, the resin pellets were foamed rapidly when heated for 60 seconds with steam in the foaming machine and the foam bodies were shrunk immediately by cooling when they were removed from the foaming machine into the atmosphere at 10° C. At this time, the expansion ratio was 31-fold. When the shrunken bodies were left standing in the atmosphere at 10° C., they gradually reexpanded and finally assumed an almost excessively bulging state at an expansion ratio of 254-fold. At this point, the closed cell content of the expanded bodies was 87% as measured by the method of ASTM D-2856. In the case of the present sample, it is noted that foamed pellets were shrunk by cooling to 31/254=0.12 times the original volume and the shrunk pellets were reexpanded to 254/31=8.2 times. The experiment described above was repeated by varying the time of foaming by heating with steam. The results are shown in Table 1.

$$b = a - \frac{100}{M} \cdot \frac{X - Y}{X \frac{1}{1 + \frac{M}{100} a}}$$

(wherein M denotes the average molecular weight of the foaming agent). The result was 0.03 g mol/(100 g of resin).

The results obtained as described above concerning the relation between the maximum expansion ratio and the foaming agent content in the resin pellet are graphically shown in FIG. 1 (indicated by the mark o). It is seen from the data that pellets foamed at a high expansion ratio are easily obtained by one step of thermal foaming with steam and that the high expansion ratio exceeding 80-fold is obtained when the foaming agent content passes the level of 0.11 g mol/(100 g of resin). Thus, the heating with steam is highly effective in promoting the foaming of pellets.

The reexpansion behavior of the shrunken foam bodies when left standing in the atmosphere at 10° C. for the case of steam feating time of 60 seconds in the aforementioned Table 1 is indicated as the locus of the expansion ratio in fold relative to the elapse of time in FIG. 2. It is noted from this diagram that thorough reexpansion is obtained after about two days' standing.

The shrunken bodies of resin foam for the case of 60 seconds' heating in Table 1 were cast to capacity into a container made of transparent plastic plates 8 mm in wall thickness to have an inner volume of the cube of 10 cm. A lid was set in place on the container in such a manner that the interior of the container would not be

TABLE 1

| Time of heating with steam (second) | 20 | 30 | 45 | 60 | 70 | 80 | 90 |
|---|---|---|---|---|---|---|---|
| Expansion ratio at shrinkage (ml/g) | 53 | 41 | 32 | 31 | 33 | 35 | 37 |
| Expansion ratio at recovery (ml/g) | 53 | 84 | 162 | 254 | 311 | 345 | 321 |
| Closed cell content (%) | 99 | 99 | 94 | 87 | 81 | 77 | 70 |
| Shrinkage ratio | 1.0 | 0.49 | 0.20 | 0.12 | 0.11 | 0.10 | 0.12 |
| (Reexpansion ratio) | (1.0) | (2.0) | (5.0) | (8.2) | (9.4) | (9.9) | (8.7) |

It is noted from the results that foamed pellets obtained at expansion ratios exceeding 80-fold in accordance with the method of this invention were amply shrunk by cooling and allowed to acquire high degrees of reexpandability. It is also noted that this shrinkage/recovery phenomenon did not occur on foamed pellets obtained at expansion ratios falling short of 80 times.

Table 1 shows that the maximum expansion ratio (345-fold) was obtained in the neighborhood of 80 seconds' heating time and both the expansion ratio and the closed cell content began to fall sharply beyond this peak. The foamed pellets which pass this peak possess inferior properties. Thus, only the foamed pellets obtained before this peak are usable for various applications.

The amount of residual foaming agent, b g mol/(100 g of resin), at the peak of the expansion ratio was determined by finding the weight of pellets, X g, before the expansion, the foaming agent content, a g mol/(100 g of resin), at that time, and the weight of shrunken pellets, Y g, after the expansion, and computing the following formula using the found values.

sealed airtightly. At this time, the void ratio of the pellets so placed in the container was determined by the water pouring method to be 52%. Apparently, the pellets were in a state abounding with voids. After three days' standing at room temperature under atmospheric pressure, the voids between the pellets and along all the corners of the container were filled up almost completely with expanded pellets. Then, the void ratio was found to be 6%. It is inferred from the observation that when the gap between opposed walls is filled with expanded pellets, the thermal insulation of the walls is improved because the gap is substantially eliminated and the transfer of heat due to the convection of air is obstructed and that when an article is wrapped with the expanded pellets in a given container, the expanded pellets well conform to the contour of the article and prevent the article from external shock and vibration. The surface pressure exerted by the aggregate of expanded pellets to bear upon the container was found to be 0.24 kg/cm².

Separately, the same box-shaped container as described above was filled with the aforementioned shrunken pellets to 60% of the height of the container and the lid was secured to the container. Then, the container was left standing under the same conditions for three days. At the end of the standing, the container was found to be filled to capacity with expanded pellets. In this case, the void ratio between the expanded pellets was found to be 19%.

The aforementioned pellets fresh from the shrinkage were pushed in a wooden box, with a lid set fast in place on the container to prevent mechanically the pellets from reexpanding. The wooden box was then left standing at room temperature under atmospheric pressure. After two weeks' standing, the wooden box was opened and the pellets were released into the atmosphere. The pellets were reexpanded at a final expansion ratio of 205-fold.

The pellets freshly shrunken as described above were placed in a bag of film made of vinylidene chloride type resin of a slow gas permeation speed, with the mouth of the bag heat sealed. The bag was then put to storage. After three months' storage, the pellets in the bag were found to remain in their shrunken state. When the bag was opened and the pellets were released into the atmosphere at room temperature, the pellets were reexpanded at a final expansion ratio of 237-fold.

The aforementioned expandable resin pellets containing the foaming agent in an amount of 0.20 g mol/(100 g of resin) were heated with steam of 0.3 kg/cm$^2$ in gauge pressure for a varying length of time, to obtain pellets foamed to a varying extent.

In this case, the pellets foamed at expansion ratios exceeding 80-fold were shrunken. These shrunken pellets were invariably left standing and curing at room temperature for two days. With a molding machine generally adopted for foamable polystyrene particles, the cured pellets were molded to produce blocks the square of 30 cm in area and 2.5 cm in thickness. In the experiment, both the prefoamed pellets which were expanded at a low ratio and were not shrunk and the foamed pellets of this invention which were expanded at high ratios exceeding 80-fold, shrunk, and reexpanded showed satisfactory moldability (secondary expandability). The shaped articles so produced were tested for expansion ratio and closed cell content. The results are shown in Table 2.

The molded articles were tested for elasticity under 5% compression by the method of JIS K-6767 and for recovery of thickness relative to the original thickness 24 hours after release from 50% compression by the method based on JIS K-6767. The results of the test, i.e. the elasticity (indicated by the mark o) and the recovery ratio (indicated by the mark o), were shown respectively in FIG. 3 and FIG. 4 as contrasted to the expansion ratios previously determined of the molded articles. It is noted from FIG. 3 that the flexibility increased in proportion as the expansion ratio increased and that when the expansion ratio exceeded the level of about 130-fold, the molded article of fair rigidity exhibited elasticity comparable to the elasticity of soft olefin foam despite the fact that it is made from a rigid resin. It is also seen from FIG. 4 that the recovery ratio was as high as 90% where the expansion ratio was beyond the level of 130-fold.

TABLE 2

| | Expansion ratio of prefoamed pellets (ml/g) | | | | |
| --- | --- | --- | --- | --- | --- |
| | 30 | 54 | 70 | 88 | 115 |
| Expansion ratio of molded article (ml/g) | 56 | 98 | 126 | 160 | 202 |
| Closed cell content of molded article (%) | 96 | 94 | 93 | 92 | 90 |

COMPARATIVE EXPERIMENT 1

By following the procedure of Example 1, foamable resin pellets were prepared from the same styrene-acrylonitrile resin containing, in an amount of 0.18 g mol/(100 g of resin), a mixed foaming agent consisting of n-pentane (gas permeation coefficient with respect to styrene-acrylonitrile resin not more than 1/5 of the permeation coefficient for air, boiling point 36° C.) and methylene chloride (gas permeation coefficient not less than 10 times the permeation coefficient for air, boiling point 40° C.) at a weight ratio of 80:20 (mol ratio of 82:18). The pellets were foamed by heating with steam. When the foamed pellets were left standing in the atmosphere at 10° C., they did not easily reexpand. The final expansion ratio was 88 ml/g. In this experiment, since the foaming agent of a low gas permeation speed was contained sufficiently, the pellets were sufficiently foamed at a high expansion ratio within the foaming vessel. When the foamed pellets were removed from the vessel and shrunk by cooling, they would not reexpand because the foaming agent had a high boiling point. Consequently, they failed to expand at a high ratio. In the pellets similarly prepared, the final expansion ratio was 53-fold and 37-fold respectively where the foaming agent content was 0.12 and 0.08 g mol/(100 g of resin). The results are shown in FIG. 1 (as indicated by the mark □).

EXAMPLE 2

By following the procedure of Example 1, foamable resin pellets were prepared from aliquots of the same styrene-acrylonitrile resin containing 0.17, 0.15, and 0.12 g mol/(100 g of resin) of a mixed foaming agent consisting of trichloromonofluoromethane (gas permeation coefficient not more than 1/5 of the permeation coefficient for air, boiling point 24° C.) and n-pentane (gas permeation coefficient not more than 1/5 of the permeation coefficient for air, boiling point 36° C.) at a weight ratio of 80:20 (mol ratio of 68:32) and possessing an average boiling point of 26° C. (as determined by subjecting the vapor pressure curves of trichloromonofluoromethane and pentane to proportional allocation in accordance with Raoult's Law). The pellets were foamed by heating with steam of 0.3 kg/cm$^2$ in gauge pressure and then tested for maximum expansion ratio in the atmosphere at 10° C. The results were 174-fold, 133-fold, and 96-fold respectively. It is seen from these results that use of a foaming agent fulfilling the requirement of this invention permits the resin pellets to be foamed at a high expansion ratio.

COMPARATIVE EXPERIMENT 2

By following the procedure of Example 1, foamable resin pellets were prepared from aliquots of the same styrene-acrylonitrile resin containing 0.21 and 0.11 g mol/(100 g of resin) of a mixed foaming agent consisting of trichloromonofluoromethane (gas permeation coefficient more than 1/5 of the permeation coefficient for air, boiling point 24° C.) and methyl chloride (gas permeation coefficient not less than 5 times the permeation coefficient for air, boiling point −24° C.) at a weight ratio of 60:40 (mol ratio of 36:64). The resin pellets were foamed by heating with steam to test for final expansion ratio. The results were 55-fold and 29-fold respectively. In this experiment, the pellets were foamed only at low expansion ratios because the foaming agent not fulfilling the requirement of this invention and having an excessively high gas permeation speed (methyl chloride) was contained in an amount exceeding 0.11 g mol/(100 g of resin) while the foaming agent fulfilling the requirement (trichloromonofluoromethane) was contained only in an amount not exceeding 0.11 g mol/(100 g of resin). The results of this experiment are shown in FIG. 1 (as indicated by the mark Δ).

EXAMPLE 3

By following the procedure of Example 1, foamable resin pellets were prepared from the same styrene-acrylonitrile resin containing 0.20 g mol/(100 g of resin) of a mixed foaming agent consisting of trichloromonofluoromethane and dichlorodifluoromethane (gas permeation coefficient not move than 1/5 of the permeation coefficient for air, boiling point −30° C.) at a weight ratio of 85:15 (mol ratio of 83:17) (average boiling point 15° C. under one atmosphere). The resin pellets were foamed for 35 seconds by heating with steam of 0.3 kg/cm² in gauge pressure. When the foamed pellets were released into the atmosphere, they immediately were shrunk. Two aliquots of the shrunken pellets were left standing to reexpand in constant temperature rooms controlled at 0° C. and 24° C.

Separately, foamable resin pellets obtained in Example 1 containing 0.22 g mol/(100 g of resin) of trichloromonofluoromethane as a foaming agent were foamed for 30 seconds by heating with steam of 0.3 kg/cm² in gauge pressure. Two aliquots of the foamed pellets were shrunk and reexpanded in the atmosphere at 0° C. and 24° C.

The reexpanding behaviors of the pellets of the above two cases are shown in Table 3.

It is noted from Table 3 that when the temperature of the atmosphere in which the foamed pellets were left standing was low, the shrunken pellets using a foaming agent having a lower boiling point were reexpanded more advantageously than those using a foaming agent having a higher boiling point, providing that the foaming agents both filled the requirement of this invention.

TABLE 3

| | Expansion ratio (ml/g) | | | | | | | |
|---|---|---|---|---|---|---|---|---|
| | Trichloromonofluoromethane (boiling point 24° C.) Standing time (days) | | | | Mixture of trichloromonofluoromethane and dichlorodifluoromethane (boiling point 15° C.) Standing time (days) | | | |
| Temperature of standing | 0 | 1 | 2 | 3 | 0 | 1 | 2 | 3 |
| 0° C. | 42 | 95 | 109 | 121 | 43 | 149 | 152 | 153 |
| 24° C. | 42 | 148 | 151 | 152 | 43 | 153 | 155 | 154 |

COMPARATIVE EXPERIMENT 3

By following the procedure of Example 2, foamable resin pellets were prepared from the same styrene-acrylonitrile resin containing 0.13 g mol/(100 g of resin) of a mixed foaming agent consisting of trichloromonofluoromethane and pentane at a weight ratio of 80:20. In an air oven kept at 105° C., aliquots of the pellets were foamed by heating for varying lengths of time. The results of the expansion ratio and heating time are shown in Table 4.

TABLE 4

| Heating time (minutes) (in oven at 105° C.) | 5.0 | 7.5 | 10 | 20 | 30 |
|---|---|---|---|---|---|
| Expansion ratio (ml/g) | 23 | 33 | 36 | 44 | 50 |

The results indicate that when air was used as a heating medium, the pellets were foamed at extremely low speeds and were not expanded at high ratios.

EXAMPLE 4

In an autoclave having an inner volume of 5 liters, 2 kg of styrene-acrylonitrile resin pellets and 1 kg of trichloromonofluoromethane were heated at 45° C. Consequently, there were obtained foamable resin pellets containing 0.19 and 0.15 g mol/(100 g of resin) of the foaming agent. When the pellets were foamed by heating with steam of 0.3 kg/cm² in gauge pressure to test for maximum expansion ratio. The results were 350-fold and 215-fold (both after 80 seconds' heating with steam). The data indicate that even when the inclusion of the foaming agent in the styrene-acrylonitrile resin was effected by the autoclave method instead of the extrusion impregnation method, the pellets were foamed at as high expansion ratios as those of Example 1.

What is claimed is:

1. Reexpandable shrunken foam bodies comprising styrene-acrylonitrile resin containing a volatile organic foaming agent or a mixture of two or more volatile organic foaming agents prepared according to the process which comprises:

providing a styrene-acrylonitrile resin containing therein a volatile organic foaming agent or a mixture of two or more foaming agents to which said resin exhibits a permeability coefficient of not more than 1/5 of the permeability coefficient which said resin exhibits to air and possesses a boiling point of not more than 30° C. under atmospheric pressure, said foaming agent or mixture of foaming agents being present in an amount of not less than 0.11 g mol/100 g of resin in the starting material;

thermally foaming said styrene-acrylonitrile resin containing said foaming agent by directly heating said resin containing said foaming agent with steam such that foam bodies thus obtained are foamed to an expansion ratio of not less than 80-fold and possess a closed cell content of not less than 75%; and shrinking said foamed resin bodies at room temperature under atmospheric pressure, thereby producing said reexpandable shrunken foam bodies containing said foaming agent in an amount of at least 0.01 g mol/100 g of resin, said shrunken foam bodies being capable of reexpanding upon standing at room temperature under atmospheric pressure substantially at a ratio (volume of reexpanded foam/volume of foam in shrunken state) of not less than 1.5.

* * * * *